April 26, 1949.  W. J. COTTON  2,468,175
APPARATUS FOR ELECTROCHEMICAL
TRANSFORMATION OF MATERIALS
Filed June 15, 1943
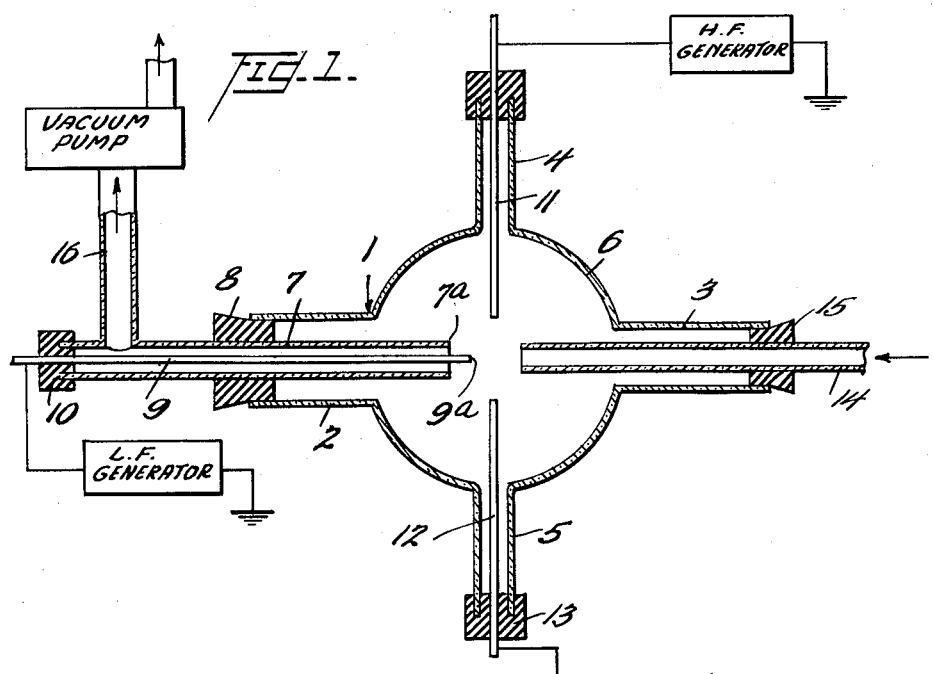
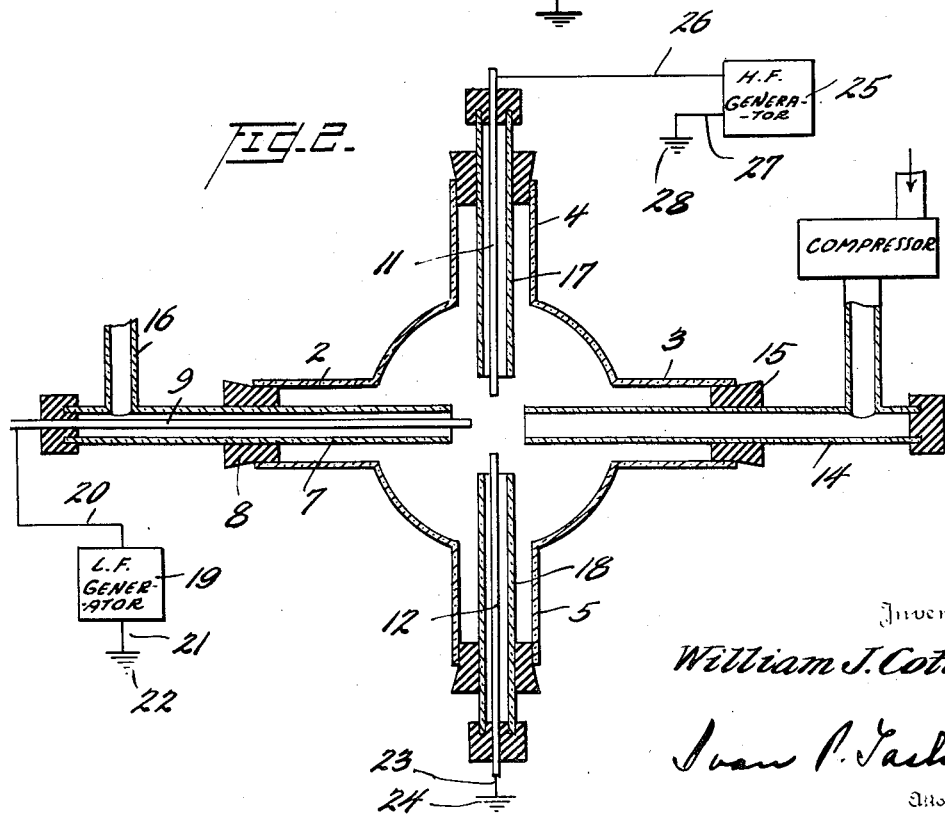
Inventor
William J. Cotton Patented Apr. 26, 1949

2,468,175

UNITED STATES PATENT OFFICE 2,468,175

APPARATUS FOR ELECTROCHEMICAL TRANSFORMATION OF MATERIALS

William J. Cotton, Chicora, Pa., assignor, by mesne assignments, to Koppers Company, Inc., a corporation of Delaware Application June 15, 1943, Serial No. 490,904

16 Claims. (Cl. 204—312)

1

This invention relates to an apparatus whereby gaseous material is subjected to the action of a plurality of crossed electrical discharges, one of said discharges preferably being generated by an alternating current. The crossed electrical discharges may be generated by crossed electrical energies of substantially the same frequency or of substantially different frequencies, or the crossed electrical discharges may be generated by electrical energy of direct current character crossed with electrical energy which is characterized by various definite frequencies, said electrical energy being usually, although not necessarily, generated by an alternating current. In other words, means other than an alternating current are now known to provide pulsating current characterized by a frequency. Electrical energy which is characterized by a frequency of the magnitude which is now known in the art as radio frequency or radar frequency is preferred, although, as hereinafter pointed out, broadly, the frequency of the electrical energy may be as low as 60 cycles, and this may be crossed with electrical energy having a frequency as high as radio frequency or radar frequency.

This invention, in one of its forms, provides an apparatus for effecting the electrochemical transformation of a gaseous material. In using the apparatus the gaseous material is subjected to the action of a plurality of crossed electrical discharges, each being generated by separate electrical components of substantially different wave length bands, at least one of said band of wave lengths, when used by itself to effect transformation of the starting material, producing an increased yield of final reaction product over that yield which would be produced if a different non-yield-increasing band of wave length were used, said crossed discharges producing a yield greater than the yield produced by either of said wave bands used by itself.

In a modification of the above, each of two optimum bands of wave lengths is used to effect transformation of the material whereby an increased yield of final reaction product is obtained over the use of non-yield-increasing bands of wave lengths.

While the broad principle above set forth is particularly applicable to the production of nitric oxide, it is not limited thereto, and may be applied to the production of any chemical from a given gaseous starting material where said starting material, on being subjected to energy characterized by a frequency which, as, for example, 60 cycles to 3,000,000 mc., exhibits one or more optimum wave band lengths which produce increased yields over what may be termed non-yield-increasing bands of wave lengths.

More specifically, the apparatus of the present invention is directed to a reactor comprising, in combination, a dielectric reaction chamber, means to introduce reacting material into the reactor chamber, means including crossed electrodes for producing crossed electrical discharges, one of said electrodes being a common ground electrode through which both of the crossed discharges pass to the ground, and means for removing the reaction product from said reactor chamber. The reactor in its preferred form is provided with a dielectric sheath member surrounding at least one of the electrodes, and the end of at least one of the electrodes, and preferably all of the electrodes, projecting beyond the inner end or ends of the sheath member or members.

It is an object of the present invention to provide a gas discharge apparatus which is simple in structure and is capable of efficiently and economically effecting the transformation of gaseous materials with optimum yields, said apparatus having positioned internally thereof a plurality of separately spaced electrodes, as, for example, three electrodes, one of said electrodes being a cold electrode and serving as a common ground with respect to the remaining high potential electrodes, the ground electrode being a low potential electrode, said electrodes forming means for producing electrical discharges of different frequencies which merge with each other to form a composite discharge.

The present invention will be described in connection with the accompanying drawing, wherein Fig. 1 sets forth a reactor apparatus in which one electrode serves as a common ground; and Fig. 2 shows a modified reactor together with its connections to the electrical generator used in conjunction therewith.

The reactor comprises a reactor vessel 1 provided with horizontally extending members 2 and 3 and vertically extending members 4 and 5, the latter projecting from the spherical member 6. Extending through the horizontal member 2 is a sheath-like member 7, which is mounted in an insulating closure member 8. Projecting within the sheath member 7 is a low frequency electrode 9, the latter being mounted in an insulating closure member 10, which also acts as a closure for the sheath member 7. The electrode 11 is a high frequency hot terminal electrode. Projecting through the reactor member 5 is a common ground electrode 12, the latter being mounted in an insulating closure 13. The electrode 12 is a common ground electrode for both circuits generating the crossed electrical discharges. The gaseous medium, which may be any of the media hereinafter set forth, enters through the inlet conduit 14, the latter being mounted in a closure member 15. It is to be noted that the inlet member 14 extends well into the discharge volume in order to insure intimate contact of the entering gaseous medium with the composite or crossed discharge. The reacted gaseous product passes first through the reactor sheath 7 and then leaves the reactor by the exit conduit 16. The electrodes may be made of any of the metals or alloys herein set forth or the equivalents thereof known in the art.

In one form of the invention, high frequency electrical energy may be supplied to electrode 11, and low frequency electrical energy may be supplied to electrode 9. The high frequency energy may vary, in the preferred form of the invention, from about 100,000 cycles to 300,000 mc. or over. This corresponds in wave length to from 3,000 meters to 1 mm. or less. The low frequency energy may vary from the lowest producible frequency, including 10 and 25 cycles, to about 3,000 mc. This corresponds to a variation in wave length of about 30,000,000 meters for 10 cycles to 10 centimeters for 3,000 mc.

In one form of the invention it is highly desirable that the two frequencies supplied to the crossed electrodes differ substantially in numerical value one from the other. The order of the difference is that the crossed frequencies acting simultaneously on a gaseous chemical material and transforming said material should, in one form of the invention, produce an increase in yield of the final reaction product over the yield that would be produced in using only the particular low frequency of the crossed discharges, or in using the particular high frequency of the crossed discharges.

While it has been stated that the high frequency should vary from about 100,000 cycles to about 300,000 mc. or over, in view of the above it is clear that the frequency of the high frequency energy may be reduced below 100,000 cycles and still be effective to carry out the present invention; and in causing the herein set forth reactor to operate efficiently. More specifically, the high frequency energy may be of the order of 10,000 to 100,000 cycles. However, most favorable results will be obtained when operating in the neighborhood of that frequency used in radio and radar work.

While in one form of the invention the crossed or merged discharges are generated by electrical energy of different frequency, the reactor herein disclosed may be operated and will adequately function to produce chemical products when the electrical energy used to generate the merged discharges is of the same frequency; or, as pointed out, the merged discharges may be generated by alternating electrical energy of any frequency in combination with direct current.

Assuming that electrode 9 is supplied with a low frequency energy and the electrode 11 is supplied with high frequency energy, the high frequency gap may vary between 8 and 25 mm., and the gap between the low frequency electrode and the ground electrode may also similarly vary. Obviously, these gaps are set forth by way of illustration and not by way of limitation, as the gaps may be considerably departed from and still come within the spirit of the present invention.

Instead of arranging the electrodes as shown in Fig. 1 of the drawing, any of the three electrodes may be the ground electrode, and the other two electrodes respectively become the high frequency electrode and the low frequency electrode, and these may be interchanged so that either one is the high frequency or the low frequency electrode.

It is desired to point out that the electrode tip 9a projects beyond the end 7a of the sheath 7. Under some circumstances, this is a desirable construction, as this insures that the tip of the low frequency electrode is not subjected to the influence of any volatile constituents emanating from the interior wall of the sheath 7. If the sheath is made of glass, it may emit active constituents which may be sodium vapor or sodium ions. There is a tendency for the results to be non-uniform if the tip 9a is enclosed within a glass sheath. While it is stated that sodium may be responsible for this non-uniformity in results, it may be caused by other constituents of the glass.

The reactor set forth in Fig. 2 is similar to that shown in Fig. 1, with the exception that the electrodes 11 and 12 are enclosed in sheath members 17 and 18, and connections to the electrical generator supplying the electrical energy is shown.

Referring to Fig. 2, the electrical energy passing through the low frequency electrode 9 is furnished by the generator 19, from which the lead 20 connects with the electrode 9 and the lead 21 is connected to ground 22.

The low frequency energy, after passing through the discharge and out through electrode 12, passes through lead 23 to ground 24. The high frequency energy is supplied by the generator 25, one lead 26 from which is connected to the high frequency electrode 11 and the other lead 27 is connected to ground 28. The high frequency energy, after passing through the discharge and out through the electrode 12, passes by means of lead 23 to ground 24.

The electrodes 9, 11 and 12 may be made of brass, copper, copper alloys, nickel, nickel alloys, tantalum, tantalum alloys, silver, silver alloys, iron, iron alloys, chromium, chromium alloys, platinum, platinum alloys, copper alloys with lithium, nickel chromium alloys, and the like. Carbon electrodes may be used. The presence of lithium in the electrode material is highly advantageous in that it increases yields and therefore any of the materials above set forth alloyable with lithium, after being alloyed therewith in amounts ranging from 1% to 5% of lithium or thereabouts, may be used as electrode materials. More specifically, the electrodes may be copper, together with .75% to 5% of lithium, or tantalum with small amounts of lithium.

In the reactor set forth, the low frequency electrode and the high frequency electrode may be made of one material and the common ground electrode may be made of another material, as, for example, the high frequency and low frequency electrodes may be made of copper and the common ground electrode may be made of nickel, to thereby provide electrodes or electrode terminals of different ion emission potentials. The reactors set forth may also be provided with electrodes and electrode tips of different conducting metals or alloys, so as to provide electrode tips, each chosen to have its own selected ion emission potential. In one form of the invention, the low frequency hot electrode 9 may be an alloy of 98% copper and 2% lithium; the high frequency hot electrode 11 may be tantalum; and the common electrode may be nickel.

The pressure which is maintained within the reactor set forth in the drawing may be sub-atmospheric, atmospheric, or super-atmospheric. Satisfactory results can be obtained when nitric oxide is manufactured in the reactors by employing pressures in the neighborhood of about one-half an atmosphere.

Although it is well known that the striking and sustaining voltages are dependent upon the pressure, the electrode gap, and the nature of the gases undergoing reaction, in general the striking voltage will vary from about 1800 to 2500 volts, and the corresponding sustaining voltages from one-half to two-thirds of these values.

The reactor of the present invention is admirably adapted for the production of nitric oxide, aldehydes, such as formaldehyde, the oxidation of sulphur dioxide to sulpuhur trioxide, or transformation of ammonia to hydrazine, the oxidation of benzene to phenol, and the like. The apparatus may be used to effect a chemical combination, splitting or breaking down, and transformation from saturated to unsaturated compounds, or vice versa. Broadly, reactors employing the basic principles of the present invention, namely, the use of crossed electrodes, one of said crossed electrodes being a ground electrode, may be employed to effect a number of chemical reactions, including chemical combination, polymerization, oxidation, and the like. Organic compounds, such as aliphatic, aromatic or cyclic hydrocarbons, aldehydes, ketones, alcohols, esters and acids, as well as nitrogen, sulphur, halogen, or their substitution products or derivatives thereof, may be treated in the reactor of the present invention, it being recognized that in some of the reactions there should be substituted for the point electrodes, non-pointed electrodes, or plate electrodes, which include button electrodes, set forth in copending application Serial No. 483,931, now abandoned, filed April 21, 1943, of which the present application is a continuation in part.

The electrical discharge in the reactor set forth in the drawing may be of the glow, corona or spark type. If the pressure at which the reaction is carried out is above about one-half an atmosphere, the discharge tends to be a corona or spark discharge, but at pressures below about one-half an atmosphere, characteristics of a glow discharge begin to become apparent and become increasingly pronounced as the pressure decreases. This pressure may be decreased until it approaches a vacuum as a lower limit. When using crossed or merged discharges, the discharge very frequently partakes of the character of both a glow and a corona discharge. By properly adjusting the frequency for a particular medium which is being chemically transformed, the reactors herein set forth using crossed or merged discharges may be operated to give either a glow or corona discharge above about one-half an atmosphere or to give either a glow or corona discharge below about one-half an atmosphere.

By "glow discharge" is meant a discharge which consists of a soft diffusion of light throughout the entire volume of space between the electrodes. This may be, although not necessarily, simultaneously accompanied by an almost complete lack of incandescence of the electrodes themselves. The glow discharge does not have a definite boundary, as is characteristic of the corona discharge. The glow is not usually of uniform intensity throughout the volume between the electrodes, the intensity being greater along the axis between the electrodes and tapering off gradually to the confines of the reactor tube.

If the energy supplied be increased, the electrodes will become incandescent without appreciably affecting the glow characteristics of the discharge.

It may be stated that the corona discharge possesses rather definite boundary characteristics, and appears as an ovoid or a bush-like projection extending downwardly from the hot high frequency electrode 11.

In the reactor herein set forth, when one of the crossed electrodes is supplied with a direct current and the other electrode with high frequency electrical energy generated by a high frequency current or in any other known manner, the direct current may be supplied in the amount of 20 milliamperes and at 900 volts; and the high frequency current may have a striking voltage of 900 volts, the amperage being 8 milliamperes. The frequency may be 2.13 mc., equivalent to 140.7 meters. The above is set forth by way of illustration and not by way of limitation. It indicates one suitable combination of direct current and alternating current of high frequency.

The above is illustrative of one of the broad phases of the present invention, namely, the production of chemical compounds by subjecting gaseous material to the action of a plurality of crossed electrodes, one of said crossed electrodes being supplied with an optimum wave band producing an optimum yield when used by itself in a reactor of the type set forth in application Serial No. 489,828, filed June 5, 1943, and the other of the crossed electrodes being supplied with electrical energy generating a different optimum wave band when used in a reactor of the type disclosed in application Serial No. 489,828, filed June 5, 1943, the crossing of electrical energy having optimum wave bands of the character herein set forth, producing a greater yield of chemical than may be produced by subjecting the starting material to the action of electrical energy having only one of said optimum wave band lengths.

The term "dielectric reactor chamber" is used herein and in the claims to define a reactor chamber constructed of electrical non-conducting material, as, for example, glass.

The term "hot" electrode as used in the specification defines the high potential electrode; and the term "cold" electrode as used in the specification defines the low potential electrode.

What is claimed is:

1. In a gas discharge apparatus for effecting the electrochemical transformation of gaseous material, the combination of a reactor having a reaction chamber comprising a pair of opposing tubular legs, and a second pair of tubular legs disposed crosswise of the first pair of opposing tubular legs, one of said latter leg members having an inlet member positioned therein, the interior ends of both pairs of said leg members opening into the reaction chamber, insulating members mounted on the exterior end of each of said leg members for supporting sheaths, sheaths mounted in said supports, a pair of hot electrodes positioned internally of the reaction chamber, a third cold ground electrode positioned internally of said reaction chamber, means for supplying cyclic electrical energy of a predetermined frequency to one of said hot electrodes, separate means for simultaneously supplying cyclic electrical energy of a different frequency to the other of said hot electrodes, each hot electrode being connected at any given time to one of said means for supplying cyclic energy, and means for removing the gaseous reaction product from said chamber, said pair of hot electrodes being positioned with respect to the cold electrode to generate a composite cyclic electrical discharge.

2. In a gas discharge apparatus for effecting the electrochemical transformation of gaseous material, the combination of a reactor having a reaction chamber having a plurality of leg members including two thereof in a diametrically opposed position and a third leg member positioned crosswise of the opposing leg members, the interior ends of said leg members opening into the reaction chamber and the exterior end of each of said leg members being provided with insulating closure members, a pair of hot high potential electrodes separately disposed internally of two of said leg members, a cold low potential ground electrode positioned internally of the third leg member, means for supplying cyclic electrical energy of a predetermined frequency to one of said hot high potential electrodes, separate means for simultaneously supplying cyclic electrical energy of a different frequency to the other of said hot electrodes, each hot electrode being connected at any given time to only one of said means for supplying cyclic energy, means for introducing reacting material into the reaction chamber, and means for removing the gaseous reaction product from the reaction chamber, said hot high potential electrodes being positioned with respect to the cold low potential electrode to generate a composite cyclic luminous electrical discharge.

3. In a gas discharge apparatus for effecting the electrochemical transformation of gaseous material, the combination of a reactor having a reaction chamber having a reaction zone therein, said reaction chamber having a plurality of leg members including two thereof in a diametrically opposed position and a third leg member positioned crosswise of the opposing leg members, the interior ends of said leg members opening into the reaction chamber, insulating sheath supports in the exterior ends of said leg members, separate hollow sheath members including electrode sheath members and an inlet sheath member, all thereof being spaced from the interior wall of the reactor chamber and mounted in each of said insulating sheath supports, the discharge end of said inlet sheath member being positioned closely adjacent the composite discharge zone of the reaction chamber, one of said electrode sheath members having one end disposed adjacent the composite discharge zone of the reaction chamber to receive the gaseous reaction products as they pass from the reaction zone, insulating means closing the outer end of each of said sheath supports, a pair of hot high potential electrodes each of which is positioned internally of the sheath member of each of two of said leg members, a cold low potential ground electrode positioned internally of the sheath member of the third leg member, said hot and cold electrodes being supported by the sheath closure members, means for supplying cyclic electrical energy of a predetermined frequency to one of said hot electrodes, separate means for simultaneously supplying cyclic electrical energy of a different frequency to the other of said hot electrodes, each hot electrode being connected at a given time to only one of said means for supplying cyclic energy, means for introducing reacting material into the inlet sheath member and means for removing the gaseous reaction product from the reaction chamber, said means including an outlet sheath member, said hot electrodes being positioned with respect to the cold electrode to generate a composite cyclic electrical discharge.

4. In a gas discharge apparatus for effecting the electrochemical transformation of gaseous material, the combination of a reactor having a reaction chamber having a plurality of leg members including two thereof in a diametrically opposed position and a third leg member positioned crosswise of the opposing leg members, the exterior ends of said leg members opening into the reaction chamber, insulating sheath supports in the exterior ends of said leg members, separate sheath members spaced from the interior wall of the reactor chamber and mounted in each of said insulating sheath supports, insulating means closing the outer end of each of said sheath supports, a pair of hot high potential electrodes each of which is positioned internally of the sheath member of each of two of said leg members, a cold ground electrode positioned internally of the sheath member of the third leg member, said hot and cold electrodes being supported by the sheath closure members, means for supplying cyclic electrical energy of a frequency varying between 1,000 cycles and 300,000 mc. to one of said hot electrodes, separate means for simultaneously supplying cyclic electrical energy of a different frequency to the other of said hot electrodes, each hot electrode being connected at any given time to only one of said means for supplying cyclic energy, means for introducing reacting material into the reaction chamber and means connected to one of said electrode sheaths for removing the gaseous reaction product from the reaction chamber, said hot electrodes being positioned with respect to the cold electrode to generate a composite luminous cyclic electrical discharge.

5. In a gas discharge apparatus for effecting electrochemical transformation of gaseous material, the combination of a reactor having a reaction chamber, means for producing cyclic electrical discharges of different frequencies which merge with each other to form a composite discharge including a plurality of separately spaced electrodes positioned internally of said reaction chamber, one of said electrodes being a cold electrode and serving as a common ground with respect to the remaining electrodes which are hot high potential electrodes, means for supplying to at least one of said hot high potential electrodes cyclic electrical energy of a predetermined frequency, means for separately and simultaneously supplying to a second of said hot high potential electrodes cyclic electrical energy of a different predetermined frequency, each hot electrode being connected at any given time to only one of said means for supplying cyclic energy, a hollow dielectric sheath spaced from and surrounding at least the major portion of one of said electrodes, said sheath member directing the flow of gaseous material around and adjacent to the electrode terminal, means for introducing reacting material into the reaction chamber, and means for removing the gaseous reaction product from the reaction chamber.

6. In a gas discharge apparatus for effecting electrochemical transformation of gaseous material, the combination of a reactor having a reaction chamber, means for producing cyclic luminous electrical discharges of different frequencies which merge with each other to form a composite discharge zone including a plurality of separately spaced electrodes positioned internally of said reaction chamber, one of said electrodes being a cold electrode and serving as a common ground with respect to the remaining electrodes which are hot high potential electrodes, means for supplying at least one of said hot high potential electrodes cyclic electrical energy of a predetermined frequency, means for separately and simultaneously supplying to a second of said hot high potential electrodes cyclic electrical energy of a different predetermined frequency, each hot electrode being connected at any given time to only one of said means for supplying cyclic energy, at least one of said electrodes being provided with a hollow dielectric sheath member spaced from and surrounding the electrode, said sheath member having its interior end adjacent the reaction zone within the reactor, said reaction zone extending substantially between the terminals of the electrodes producing the merged discharge, said sheath member directing the flow of gaseous material around and adjacent to the electrode terminal, inlet means for introducing gaseous reacting material into the reaction zone, the discharge end of said means being positioned closely adjacent the composite luminous electrical discharge zone to insure intimate contact of the entering gaseous medium with the composite electrical discharge, and means for removing the gaseous reaction product from the reaction chamber.

7. In a gas discharge apparatus for effecting electrochemical transformation of gaseous material, the combination of a reaction having a reactor chamber, means for producing cyclic luminous electrical discharges of different frequencies which merge with each other to form a composite discharge including a plurality of separately spaced electrodes, one of said electrodes being a cold low potential electrode and serving as a pairing ground electrode for each of two of the remaining electrodes which are hot high potential electrodes, means for supplying to at least one of said hot high potential electrodes cyclic electrical energy of a predetermined frequency, means for separately and simultaneously supplying to a second of said remaining electrodes cyclic electrical energy of a different predetermined frequency, each hot high potential electrode being connected at any given time to only one of said means for supplying cyclic energy, at least one of said electrodes being provided with a hollow dielectric sheath member spaced from and surrounding the electrode, said sheath member having its interior end adjacent the reaction zone within the reactor, said reaction zone extending substantially between the terminals of the electrodes producing the merged discharge, said sheath member directing the flow of gaseous material around and adjacent to the electrode terminal, means for introducing reacting material into the reaction chamber, and means for removing the gaseous reaction product from the reaction chamber.

8. In a gas discharge apparatus for effecting the electrochemical transformation of gaseous material, the combination of a reactor having a reaction chamber, means within said chamber for producing cyclic electrical discharges of different frequencies which merge with each other to form a composite luminous discharge, said means comprising a plurality of high potential electrodes and a cold low potential ground electrode through which electrical discharges from said high potential electrodes pass to ground, means for supplying to one of said high potential electrodes cyclic electrical energy of a predetermined frequency, means for separately and simultaneously supplying to a second of said high potential electrodes cyclic electrical energy of a different predetermined frequency, each high potential electrode being connected at a given time to only one of said means for supplying cyclic energy, at least one of said electrodes having a dielectric sheath member extending from adjacent the center of the reaction chamber to an outlet member connected thereto at a point remote from the center of the reactor, an inlet member supported by the reactor and located substantially diametrically opposite to said sheath member and having its interior end adjacent the center of the reactor to deliver a gaseous medium to be reacted into the electrode discharge zone between the electrode terminals, said sheath electrode member receiving the reacted gaseous medium at its interior end and delivering the reacted gaseous medium to said outlet member, said sheath member at its interior end directing the flow of gaseous material around and adjacent to the electrode terminal.

9. In a gas discharge apparatus for effecting the electrochemical transformation of gaseous material, the combination of a reactor having a reaction chamber, means for introducing reacting material therein, means for removing gaseous reaction product from said chamber, electrode means disposed in said chamber to simultaneously produce cyclic electrical discharges which merge with each other to form a composite luminous discharge zone, said means comprising a plurality of high potential electrodes, and a cold ground electrode through which electrical discharges from said high potential electrodes pass to ground, means for supplying electrical energy of a predetermined frequency varying between 100,000 cycles and 300,000 mc. to one of said high potential electrodes, and separate means for simultaneously supplying cyclic electrical energy of a different predetermined frequency to at least another of said high potential electrodes, each high potential electrode being connected at any given time to only one of said means for supplying said cyclic electrical energy.

10. In a gas discharge apparatus for effecting the electrochemical transformation of gaseous material, the combination of a reactor having a reaction chamber, means for introducing reacting material therein, means for removing gaseous reaction product from said chamber, means in said chamber for producing cyclic electrical discharges which merge with each other to form a composite luminous discharge, said means comprising a plurality of high potential electrodes and a cold ground electrode from which electrical discharges from said high potential electrode pass to ground, a hollow dielectric sheath surrounding at least the major portion of one of said electrodes, the interior end of said sheath terminating adjacent the electrode terminal of the electrode and receiving gaseous reacting material which passes through the dielectric sheath to said means for removing the gaseous reaction product, means for supplying electrical energy of a predetermined frequency to one of said high potential electrodes, and separate means for simultaneously supplying cyclic electrical energy of a different predetermined frequency to at least another of said high potential electrodes, each high potential electrode being connected at a given time to only one of said means for supplying cyclic electrical energy, said high potential electrodes being positioned with respect to the cold low potential electrode to generate the aforesaid cyclic composite electrical discharge.

11. In a gas discharge apparatus for effecting the electrochemical transformation of gaseous material, the combination of a reactor having a reaction chamber, means for introducing reacting material therein, means for removing gaseous reaction product from said chamber, means in said chamber for producing cyclic electrical discharges which merge with each other to form a composite luminous discharge, said means comprising a plurality of high potential electrodes and a cold ground electrode from which electrical discharges from said high potential electrodes pass to ground, a hollow dielectric sheath surrounding at least the major portion of one of said electrodes, the interior end of said sheath terminating adjacent the electrode terminal of the electrode and receiving gaseous reacting material which passes through the dielectric sheath to said means for removing the gaseous reaction product, and means for supplying electrical energy of a predetermined frequency varying between 1000 cycles and 300,000 mc. to one of said high potential electrodes, and separate means for simultaneously supplying cyclic electrical energy of a different predetermined frequency to at least another of said high potential electrodes, each high potential electrode being connected at a given time to only one of said means for supplying cyclic electrical energy, said high potential electrodes being positioned with respect to the cold law potential electrode to generate the aforesaid cyclic composite electrical discharge.

12. In a gas discharge apparatus for effecting the electrochemical transformation of gaseous material, the combination of a reactor having a reaction chamber, means for introducing reacting material therein, means for removing gaseous reaction product from said chamber, means in said chamber for producing cyclic electrical discharges which merge with each other to form a composite luminous discharge, said means comprising a pair of high potential electrodes and a single cold ground electrode from which electrical discharges from said high potential electrodes pass to ground, a hollow dielectric sheath surrounding at least the major portion of one of said electrodes, the interior end of said sheath terminating adjacent the electrode terminal of the electrode and receiving gaseous reacting material which passes through the dielectric sheath to said means for removing the gaseous reaction product, means for supplying electrical energy of a predetermined frequency to one of said pair of high potential electrodes, and separate means for simultaneously supplying cyclic electrical energy of a different predetermined frequency to the other of said pair of high potential electrodes, each high potential electrode being connected at a given time to only one of said means for supplying cyclic electrical energy, said high potential electrodes being positioned with respect to the cold low potential electrode to generate the aforesaid cyclic composite electrical discharge.

13. In a gas discharge apparatus for effecting the electrochemical transformation of gaseous material, the combination of a reactor having a reaction chamber comprising a pair of opposing tubular legs, one of said latter leg members having a hollow inlet positioned therein, and a second pair of tubular legs disposed crosswise of first pair of opposing tubular legs, the interior ends of both pairs of leg members opening into the reaction chamber, insulating members mounted on the exterior end of said leg members for supporting electrode sheath members and on the inlet for respectively supporting the electrode sheath member and the inlet sheath member, a pair of hot or high potential electrodes positioned internally of the hollow electrode sheath member, a third cold electrode positioned internally of its sheath member, means for supplying cyclic electrical energy of a frequency varying between 1000 cycles and 300,000 mc. to one of said hot electrodes, separate means for simultaneously supplying cyclic electrical energy of a different frequency to the other of said hot electrodes, each of the latter being connected at any given time to only one of said means for supplying cyclic electric energy, means connected to the inlet leg member for introducing reacting material into said inlet member, the reacting material passing to the substantial center of the reaction chamber, and means for removing the gaseous reaction product from said chamber, said pair of high potential electrodes being positioned with respect to the cold electrode to generate a composite cyclic luminous electrical discharge.

14. In a gas discharge apparatus for effecting the electrochemical transformation of gaseous material, the combination of a reactor having a reaction chamber, means for introducing reacting material therein, means within said chamber for producing cyclic electrical discharges of different frequencies which merge with each other to form a composite luminous discharge, said means comprising a plurality of high potential electrodes and a cold low potential ground electrode through which electrical discharges from said high potential electrodes pass to ground, means for supplying to one of said high potential electrodes cyclic electrical energy of a predetermined frequency, means for separately and simultaneously supplying to a second of said high potential electrodes cyclic electrical energy of a different predetermined frequency, each high potential electrode being connected at a given time to only one of said means for supplying cyclic energy, at least one of said electrodes having a hollow dielectric sheath member provided with an interior end adjacent the center of the reactor discharge zone, said hollow sheath extending from said discharge zone to a point remote from the discharge zone where it is provided with an outlet member, said sheath electrode member receiving the reacted gaseous medium at its interior end and delivering the reacted gaseous medium to said outlet member, said sheath member at its interior end directing the flow of gaseous material around and adjacent to the electrode terminal.

15. In a gas discharge apparatus for effecting the electrochemical transformation of gaseous material, the combination of a reactor having a reaction chamber, means for introducing reacting material therein, means for removing gaseous reaction product from said chamber, electrode means disposed in said chamber to simultaneously produce cyclic electrical discharges which merge with each other to form a composite luminous discharge zone, said means comprising a high frequency high potential electrode, a low frequency high potential electrode disposed at substantially right angles to said high frequency high potential electrode, and a low potential common ground electrode through which electrical discharges from said high potential electrodes pass to ground, said low potential ground electrode being oppositely disposed to the high frequency high potential electrode, means for supplying electrical energy of a predetermined frequency varying between 100,000 cycles and 300,000 mc. to one of said high potential electrodes, and separate means for simultaneously supplying cyclic electrical energy of a different predetermined frequency to at least another of said high potential electrodes, each high potential electrode being connected at any given time to only one of said means for supplying said cyclic electrical energy.

16. In a gas discharge apparatus for effecting the electrochemical transformation of gaseous material, the combination of a reactor having a reaction chamber, means for introducing reacting material therein, means for removing gaseous reaction product from said chamber, electrode means disposed in said chamber to simultaneously produce cyclic electrical discharges which merge with each other to form a composite luminous discharge zone, said means comprising a high frequency high potential electrode, a low frequency high potential electrode, and a low potential common ground electrode through which electrical discharges from said high potential electrodes pass to ground, one of said latter two electrodes being disposed at substantially right angles to said high frequency electrode and the other of said latter two electrodes being oppositely disposed to said high frequency high potential electrode, means for supplying electrical energy of a predetermined frequency varying between 100,000 cycles and 300,000 mc. to one of said high potential electrodes, and separate means for simultaneously supplying cyclic electrical energy of a different predetermined frequency to at least another of said high potential electrodes, each high potential electrode being connected at any given time to only one of said means for supplying said cyclic electrical energy.

WILLIAM J. COTTON.

REFERENCES CITED

The following references are of record in the file of this patent:

UNITED STATES PATENTS

| Number | Name | Date |
| --- | --- | --- |
| 578,685 | Whitney | Mar. 9, 1897 |
| 644,510 | Frost | Feb. 27, 1900 |
| 941,768 | Dieffenbach et al. | Nov. 30, 1909 |
| 1,035,684 | Bunet et al. | Aug. 13, 1912 |
| 1,055,331 | Kochmann | Mar. 31, 1913 |
| 1,060,839 | Hauss | May 6, 1913 |
| 1,233,925 | Serpek | July 17, 1917 |
| 1,453,435 | Buettner | May 1, 1923 |
| 1,601,500 | Island | Sept. 28, 1923 |
| 1,912,373 | Jakosky et al. | June 6, 1933 |
| 2,106,780 | Whittier | Feb. 1, 1938 |
| 2,313,028 | Siegmann | Mar. 2, 1943 |

FOREIGN PATENTS

| Number | Country | Date |
| --- | --- | --- |
| 5,688 | Great Britain | 1904 |
| 14,871 | Great Britain | 1912 |
| 400,431 | Great Britain | 1933 |
| 270,009 | Italy | Dec. 16, 1929 |